Patented Mar. 20, 1945

2,371,655

UNITED STATES PATENT OFFICE 2,371,655

LUBRICANT COMPOSITIONS

Herschel G. Smith, Wallingford, and Troy L. Cantrell, Lansdowne, Pa., assignors to Gulf Oil Corporation, Pittsburgh, Pa., a corporation of Pennsylvania No Drawing. Application December 6, 1941, Serial No. 422,008

9 Claims. (Cl. 252—51)

This invention relates to improvements in lubricant compositions; and more particularly to light lubricating oil compositions of the type known as household lubricants.

Household lubricants are low viscosity oils intended for lubricating electric fans, guns and all sorts of light mechanism, with exposed surfaces of steel, copper and other metals. In general, such coils are applied and used as a more or less stationary film to protect surfaces exposed to the atmosphere. Plain mineral oils under such conditions do not afford adequate protection against rusting or corrosion or both, and are open to other objections. Various mineral oil compositions have been proposed, containing substances intended to overcome the limitations of plain mineral oil. None has proved entirely satisfactory. It is difficult to prepare a compounded oil containing a plurality of agents each intended to perform a specific function while not interfering with the others, and many compounded oils show a tendency to discolor or deposit insoluble matter on long standing. This is especially true of oils containing castor oil.

One object of the present invention is the provision of a household oil composition which has excellent lubricating properties, which is itself non-corrosive, inert and insensitive to moisture, air, etc., and which has the property of protecting steel and other metal surfaces from rusting and other forms of corrosion, even on long exposure to adverse atmospheric conditions; and the provision of such an oil which is clear and light in color as prepared and which even on long standing remains bright and clear, without development of haze, sediment or discoloration.

These and other objects are achieved by the provision of a lubricating oil composition, the base of which is a light, highly refined mineral oil of viscosity about 60 to 150 seconds SUV at 100° F.; 100-second oil being especially advantageous. In such an oil are dissolved or blended minor amounts of (1) an amine salt of an organic phosphate, as a rust inhibitor, in amount sufficient to protect steel surfaces from rust when filmed with the composition; (2) an oil-miscible castor oil to serve as an oiliness agent; (3) a refined sperm oil ester or its equivalent, as a gum-resistant oiliness agent and stabilizer for the castor oil, and (4) an oil-soluble anti-oxidant.

In preparing our household oil, if desired, each agent can be separately and directly added to the lubricating oil base, but it is often more convenient to blend the several agents together before adding them. These particular agents will blend together without mutual deleterious effects, and the resulting composition is readily blended with oils.

1. The rust inhibitor is advantageously an amine salt of isoamyl octyl phosphate, prepared by bringing into reaction isoamyl octyl acid phosphate and so-called cocoamine, which is a commercially available material prepared by converting coconut oil fatty acids into the corresponding amine. It consists mostly of mono-lauryl amine, $CH_3(CH_2)_{10}CH_2-NH_2$, with minor amounts of adjacent homologues. In preparing this rust inhibitor the reaction between the amine and the acid phosphate is so controlled as to bring the pH of the product within the range 5.5 to 7.5. This inhibitor is disclosed in our prior copending application Serial No. 420,438, filed November 25, 1941.

As disclosed in said application Serial No. 420,438, this inhibitor can be readily prepared by reacting cocoamine with isoamyl octyl acid phosphate in approximately equimolecular ratios, the reaction being so controlled as to produce substantially neutral reaction mixtures having a pH value within the range 5.5 to 7.5, as illustrated in Examples 1 and 2 of that application. The isoamyl octyl acid phosphate employed is a di-ester of ortho phosphoric acid having the following formula:

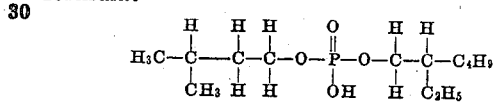

This compound is also known as 3-methyl-butyl, 2-ethyl-hexyl ortho-phosphate. It readily reacts with cocoamine and other primary fatty amines containing from 8 to 18 carbon atoms.

That is, as further disclosed in our prior application Serial No. 420,438, other amines besides cocoamine can be employed, all belonging to the class of primary fatty amines containing from 8 to 18 carbon atoms. These amines include mono-capryl, $CH_3(CH_2)_8CH_2NH_2$, mono-lauryl, mono-myristyl, mono-palmityl and mono-stearyl amines.

Further, in lieu of the above rust inhibitors, there can be employed the reaction product of isoamyl octyl acid phosphate with di-cyclohexyl amine in approximately equimolecular proportions and adjusted to a pH within the range 5.5 to 7.5, as described in our prior copending application Serial No. 420,439, filed Nov. 25, 1941.

As shown in our prior applications Serial Nos. 420,438 and 420,439, such rust inhibitors are readily soluble in mineral oils and the mineral oil solutions thereof effectively protect metals against rusting and corrosion when applied thereto.

In the present invention, we get along with less of these rust inhibitors than would otherwise be necessary by virtue of the presence in the present compositions of ingredients 2 and 3 (see below). These last have some anti-rust properties but not enough to afford adequate protection were they relied on alone. But their effect, in the proportions indicated, is cumulative with that of the aminophosphate to impart in the composition entirely adequate anti-rust properties 2. The oiliness agent is, as stated, a mineral-oil-miscible castor oil. Castor oil itself is not miscible with mineral oils but it can be processed (partially dehydroxylated) in known ways to render it oil-miscible, without detracting from the desirable oiliness of normal castor oil. The modified castor oil is equally effective as regards steel-to-steel lubrication and lubrication of steel in contact with bronze and other metals. Thus it contributes to the wide range of utility of our oil composition.

Oil-soluble castor oil is excellent as an oiliness agent but it has a tendency to develop insoluble matters or haze in the course of long standing. We effectually restrain this tendency by incorporation of ingredient No. 3, the monohydric alcohol fatty acid ester.

3. The gum-resistant oiliness agent is advantageously a substantially pure sperm oil ester, free from water and glycerides. This substance is very resistant to oxidation and gumming. Furthermore, in our composition it serves as an excellent solvent or blending agent; it facilitates the preparation of concentrates with the other ingredients, and its prevents development of insoluble matter, haze, sediment, etc. on long standing, which might otherwise occur due to the presence of the modified castor oil. Only a small amount of the esters is necessary, sufficient to prevent this last-mentioned effect, in view of the presence of the partially dehydroxylated castor oil which is itself an excellent oiliness agent. In lieu of sperm oil esters, which are essentially oleic-acid esters of long-chain monohydric alcohols, we can employ similar fatty-acid esters of short chain monohydric alcohols and derivatives thereof; e. g. ethyl oleate, butyl oleate, butyl stearate and ethyl thiostearate.

4. The fourth ingredient, an oil-soluble antioxidant, to retard the formation of oil acids, is a tertiary alkyl phenol antioxidant, such as that prepared by alkylating a phenol with refinery gas: see U. S. Patent 2,149,759, issued March 7, 1939, to T. L. Cantrell. Examples of this class of material are 2,4,6-tri-tertiary butyl phenol, and 2,6-di-tertiary butyl-para cresol. These oxidation inhibitors are among the few that can be employed in the proportions indicated without developing insoluble matters or darkening in color. They serve as additional stabilizing agents and solvents for the modified castor oil. The mineral oil itself is fairly stable, but when there is added an oiliness agent such as partially dehydroxylated castor oil, a compounded oil containing this material will more readily oxidize, with development of insoluble matter, if some of this type of inhibitor is not present. We add the oil oxidation inhibitor to counterbalance the defects that might otherwise be encountered from the oil soluble castor oil.

One good example of a composition within the purview of the invention is compounded with refined lubricating oil of 100 viscosity, SUV, at 100/ F., as follows:

| | Per cent |
|---|---|
| Base oil | 99.4 |
| Mineral-oil-miscible castor oil | 0.1 |
| Rust inhibitor - cocoamine isoamyl - octyl phosphate (pH 5.5–7.5) | 0.1 |
| Sperm oil ester (glycerine-free) | 0.3 |
| 2,4,6-tri-tertiary butyl phenol | 0.1 |

The above oil composition exhibits the following properties:

| | | |
|---|---|---|
| Gravity | °API | 28.8 |
| Viscosity, SUV: | | |
| 100° F | | 103 |
| Flash, OC | °F | 535 |
| Fire, OC | °F | 375 |
| Corrosion test (see below): | | |
| Duration of tests | days | 12 |
| Temperature | °F | 122 |
| Test strip (see below): | | |
| Steel | Passes (no corrosion) | |
| Copper | Passes (no corrosion) | |
| Air rate | cc./hr | 2000 |
| Water added | per cent | 10 |
| Salt (3.39%) | | |

Substantial amounts of castor oil can be incorporated in this composition if desired.

In the following are set forth optimum ranges of proportions for the several constituents:

| | Per cent |
|---|---|
| Base oil | 96.5 to 99.75 |
| Rust inhibitor | 0.05 to 1.0 |
| Oil-miscible castor oil | 0.05 to 1.0 |
| Gum-resistant oiliness agent | 0.10 to 1.0 |
| Oil-soluble anti-oxident | 0.05 to 0.5 |

In determining the properties of our oil compositions, a drastic test was employed which comprises immersing a steel strip in 36 cc. of oil in a test tube and adding thereto 4 cc. of sea water, placing the assembled tube in a water bath controlled at 122° F., and passing 2000 cc. of moist air per hour into the tube at a point near the bottom to mix the oil and water and create drastic oxidizing conditions. This test is conducted for 12 days, and make-up water is added each 24 hours to maintain the level of water.

In the example, the steel test strip in the presence of the uncompounded base oil showed rust within 6 hours, whereas the steel strip in the compounded product showed no rust in 12 days. Tests with strips of other metals, e. g. copper, gave similar good results.

The oiliness properties were evaluated with the aid of a Falex lubricant tester; a device making use of a shaft rotated between two well-machined test pieces to which controlled pressure may be applied. Measurement of the wear is made at the end of the test. The improved oil shown in the example in this test developed a wear of only 15 teeth, whereas uncompounded oil failed to carry the test load.

In order to evaluate the antigumming properties, 5 grams of oil were heated in a copper dish at 212° F. for 48 hours, and the sludge and gum deposits inspected. Our oil showed no evidence of gumming or sludge deposits.

That is, the improved lubriceting compositions prepared in accordance with the present invention have a plurality of advantageous properties which render them particularly useful and effective as lubricants for ferrous and non-ferrous metals; they being capable of preventing rusting and corrosion of such metals in the presence of air and moisture, as well as effectively lubricating the same.

The present application is a continuation-in-part of our prior applications, Serial Nos. 420,438 and 420,439, filed Nov. 25, 1941. The rust inhibitors described in those prior applications are advantageous in preparing the improved lubricants of the present invention as described and illustrated ante.

What we claim is:

1. An improved petroleum oil composition, effective as a lubricant for ferrous and non-ferrous metal surfaces and capable of preventing rusting and corrosion thereof in the presence of moisture and air, comprising a mineral lubricating oil containing 0.05 to 1.0 per cent of a partially dehydroxylated castor oil, 0.1 to 1.0 per cent of a fatty monoester, 0.05 to 0.5 per cent of a tertiary alkyl phenol and 0.05 to 1.0 per cent of a substantially neutral addition product of 3-methyl-butyl, 2-ethyl-hexyl acid phosphate and a primary fatty amine, dissolved therein, said amine being a nono-alkyl amine containing from 8 to 18 carbon atoms, said substantially neutral product containing said acid phosphate and amine chemically combined together in molar ratios between 1.1 and 1:1.1 and having a pH between 5.5 and 7.5 and being capable of inhibiting the corrosion of said metals in the presence of air and moisture, said partially dehydroxylated castor oil being readily soluble in the mineral oil but having a tendency to oxidize and develop insoluble matter, the said alkyl phenol being a 2,4,6-alkyl phenol containing at least one tertiary butyl group and being capable of inhibiting the oxidation of the partially dehydroxylated castor oil, the said fatty monoester being an ester of a fatty acid and a monohydric alcohol and being capable of preventing development of insoluble matter in said composition, all of said agents being mutually soluble and miscible in the proportions specified and the so-blended composition being a stable, clear, homogeneous solution of said agents in the mineral oil, the said oil solution thereof having excellent oiliness and other lubricating properties on both ferrous and non-ferrous metals, being non-corrosive to such metals, being inert and insensitive to moisture and air and being free from haze and insoluble matters and stable against discoloration, development of haze and deposition of insoluble matters.

2. The improved composition of claim 1 wherein said amine is cocoamine.

3. The improved composition of claim 1 wherein said fatty monoester is sperm oil.

4. The improved composition of claim 1 wherein said fatty monoester is butyl oleate.

5. The improved composition of claim 1 wherein said fatty monoester is butyl stearate.

6. The improved composition of claim 1 wherein said tertiary alkyl phenol is 2,4,6-tri-tertiary butyl phenol.

7. The improved composition of claim 1 wherein said tertiary alkyl phenol is 2,6-di-tertiary-butyl paracresol.

8. The improved composition of claim 1 wherein said amine is cocoamine, said fatty monoester is sperm oil, and said tertiary alkyl phenol is 2,4,6-tri-tertiary butyl phenol.

9. An improved petroleum oil composition, effective as a lubricant for ferrous and non-ferrous metal surfaces and capable of preventing rusting and corrosion thereof in the presence of moisture and air, comprising a mineral lubricating oil containing 0.1 per cent of a partially dehydroxylated castor oil, 0.3 per cent of sperm oil, 0.1 per cent of 2,4,6-tri-tertiary butyl phenol and 0.1 per cent of a substantially neutral addition product of cocoamine and 3-methyl-butyl, 2-ethyl-hexyl acid phosphate, dissolved therein, said substantially neutral product containing said acid phosphate and amine chemically combined together in molar ratios between 1.1 and 1:1.1 and having a pH between 5.5 and 7.5 and being capable of inhibiting the corrosion of said metals in the presence of air and moisture, said partially dehydroxylated castor oil being readily soluble in the mineral oil but having a tendency to oxidize and develop insoluble matter, said 2,4,6-tri-tertiary butyl phenol being capable of inhibiting the oxidation of the partially dehydroxylated castor oil, the sperm oil being capable of preventing the development of insoluble matter in said composition, all of said agents being mutually soluble and miscible in the proportions specified and the so blended composition being a stable, clear, homogeneous solution of said agents in the mineral oil.

HERSCHEL G. SMITH.
TROY L. CANTRELL.